US012692909B2

(12) United States Patent
Kobayashi

(10) Patent No.: US 12,692,909 B2
(45) Date of Patent: Jul. 28, 2026

(54) CLUTCH DEVICE

(71) Applicant: Kabushiki Kaisha F.C.C., Hamamatsu (JP)

(72) Inventor: Yuki Kobayashi, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 19/302,347

(22) Filed: Aug. 18, 2025

(65) Prior Publication Data

US 2025/0369487 A1     Dec. 4, 2025

Related U.S. Application Data

(63) Continuation of application No. PCT/JP2024/020745, filed on Jun. 6, 2024.

(30) Foreign Application Priority Data

Jul. 4, 2023     (JP) ................................. 2023-110206

(51) Int. Cl.
  *F16D 13/56*        (2006.01)
  *F16D 13/69*        (2006.01)
        (Continued)
(52) U.S. Cl.
  CPC ............. *F16D 13/56* (2013.01); *F16D 13/69* (2013.01); *F16D 2013/565* (2013.01); *F16D 13/71* (2013.01); *F16D 43/216* (2013.01)
(58) Field of Classification Search
  CPC .......... F16D 13/52; F16D 13/54; F16D 13/56; F16D 13/585; F16D 13/71; F16D 13/69;
        (Continued)

(56) References Cited

U.S. PATENT DOCUMENTS

2009/0078526 A1* 3/2009 Kawatsu ................. F16D 13/56
                                                      192/70.23
2009/0321212 A1* 12/2009 Gokan .................... F16D 13/56
                                                      192/70.23
                (Continued)

FOREIGN PATENT DOCUMENTS

EP          3767121 A1      1/2021
EP          3998412 A1      5/2022
                (Continued)

OTHER PUBLICATIONS

JP60184720 translation (Year: 1985).*
                (Continued)

*Primary Examiner* — Timothy Hannon
(74) *Attorney, Agent, or Firm* — Keating & Bennett, LLP

(57)        ABSTRACT

A clutch device includes a clutch center, a pressure plate movable toward and away from and rotatable with respect to the clutch center, and a disc spring held by the clutch center. The disc spring is contactable with output-side rotating plates held by the clutch center, is located between two output-side rotating plates adjacent to each other in a direction among the output-side rotating plates held by the clutch center, and is located on the side of a second direction with respect to a center in the direction from a first output-side rotating plate located farthest in a first direction among the output-side rotating plates held by the clutch center to a second output-side rotating plate located farthest in the second direction among the output-side rotating plates held by the clutch center.

9 Claims, 9 Drawing Sheets

(51) Int. Cl.
    *F16D 13/71*         (2006.01)
    *F16D 43/21*         (2006.01)

(58) Field of Classification Search
    CPC ......... F16D 2013/565; F16D 2013/642; F16D
                2013/706; F16D 2023/123; F16D 43/216;
                F16D 43/215; F16D 43/213; F16D 43/21
    See application file for complete search history.

(56) References Cited

U.S. PATENT DOCUMENTS

| | | | |
|---|---|---|---|
| 2010/0163361 A1 | 7/2010 | Suzuta et al. | |
| 2014/0326570 A1 | 11/2014 | Isobe et al. | |
| 2016/0281796 A1* | 9/2016 | Yamada | F16D 13/54 |
| 2016/0332636 A1* | 11/2016 | Lida | B60W 10/11 |
| 2019/0017554 A1* | 1/2019 | Isobe | F16D 13/04 |

| | | | |
|---|---|---|---|
| 2019/0285125 A1 | 9/2019 | Imanishi et al. | |
| 2021/0356000 A1 | 11/2021 | Ozawa et al. | |
| 2023/0160440 A1* | 5/2023 | Ghelardoni | F16D 13/56 |
| | | | 192/66.3 |

FOREIGN PATENT DOCUMENTS

| | | | |
|---|---|---|---|
| JP | 60184720 A | * | 9/1985 |
| JP | 2005114121 A | | 4/2005 |
| JP | 2012057728 A | | 3/2012 |
| JP | 2013137039 A | | 7/2013 |
| WO | 2020116507 A1 | | 6/2020 |

OTHER PUBLICATIONS

International Search Report in PCT/JP2024/020745, mailed Aug. 20, 2024, 2 pages.
Official Communication issued in corresponding European Patent Application No. 24835844.2, mailed on Apr. 30, 2026, 8 pages.

* cited by examiner

CLUTCH DEVICE

CROSS REFERENCE TO RELATED APPLICATIONS

This application claims the benefit of priority to Japanese Patent Application No. 2023-110206 filed on Jul. 4, 2023 and is a Continuation Application of PCT Application No. PCT/JP2024/020745 filed on Jun. 6, 2024. The entire contents of each application are hereby incorporated herein by reference.

BACKGROUND OF THE INVENTION

1. Field of the Invention

The present invention relates to clutch devices.

2. Description of the Related Art

A straddled vehicle such as a motorcycle or the like includes a clutch device capable of allowing or blocking transfer of a rotation driving force of a motive power source such as an engine or the like to a drive wheel. For example, Japanese Patent Application Publication No. 2013-137039 discloses a motive power transfer device (hereinafter, referred to as a "clutch device") including an input member (hereinafter, referred to as an "input shaft") coupled to the side of the engine, an output member (hereinafter, referred to as an "output shaft") coupled to the side of the drive wheel, a clutch member (hereinafter, referred to as a "clutch center") coupled with the output shaft, and a pressure member (hereinafter, referred to as a "pressure plate") movable toward, or away from, the clutch center.

The clutch center and the pressure plate in Japanese Patent Application Publication No. 2013-137039 each include an assist cam surface to generate a force in a direction so as to move the pressure plate toward the clutch center to increase a pressing force (contact pressure force) between input-side rotating plates and output-side rotating plates when the rotation driving force of the engine is allowed to be transferred to the output shaft. In addition, the clutch device of Japanese Patent Application Publication No. 2013-137039 includes a disc spring attenuating the pressing force in order to suppress a rapid increase in an assist torque due to the pressing force.

SUMMARY OF THE INVENTION

In Japanese Patent Application Publication No. 2013-137039, the disc spring is held by the clutch center and is located at a position farthest from the pressure plate in a moving direction of the pressure plate. Therefore, a problem may occur that a clutch device in which a relatively large pressing force is set, or a clutch device including a relatively large number of output-side rotating plates and a relatively large number of input-side rotating plates, does not effectively attenuate the pressing force.

Example embodiments of the present invention provide clutch devices each capable of effectively reducing or preventing a rapid increase in an assist torque by effectively attenuating a pressing force generated by an effect of an assist cam surface.

A clutch device according to an example embodiment of the present invention is a clutch device to allow or block transfer of a rotation driving force of an input shaft to an output shaft. The clutch device includes a clutch center housed in a clutch housing holding a plurality of input-side rotating plates rotationally drivable by rotational driving of the input shaft, the clutch center holding a plurality of output-side rotating plates located alternately with the input-side rotating plates, and being rotationally drivable together with the output shaft, a pressure plate movable toward and away from and rotatable with respect to the clutch center, the pressure plate being capable of pressing the input-side rotating plates and the output-side rotating plates, and a disc spring held by the clutch center. The clutch center includes a center-side cam portion including a center-side assist cam surface to generate a force in a direction so as to move the pressure plate toward the clutch center, in order to increase a pressing force between the input-side rotating plates and the output-side rotating plate when the clutch center rotates with respect to the pressure plate. The pressure plate includes a pressure-side cam portion including a pressure-side assist cam surface to generate a force in a direction so as to move the pressure plate toward the clutch center in order to increase the pressing force between the input-side rotating plates and the output-side rotating plate when the pressure plate rotates with respect to the clutch center. Assuming a direction in which the pressure plate moves is a moving direction, a direction in which the pressure plate moves toward the clutch center is a first direction, and a direction in which the pressure plate moves away from the clutch center is a second direction, the disc spring is contactable with the output-side rotating plates held by the clutch center, is located between two output-side rotating plates adjacent to each other in the moving direction among the output-side rotating plates held by the clutch center, and is located on a side of the second direction with respect to a center in the moving direction from a first output-side rotating plate located farthest in the first direction among the plurality of output-side rotating plates held by the clutch center to a second output-side rotating plate farthest in the second direction among the plurality of output-side rotating plates held by the clutch center.

With the clutch device according to this example embodiment of the present invention, the disc spring held by the clutch center is contactable with the output-side rotating plates held by the clutch center, is provided between the output-side rotating plates adjacent to each other in the moving direction and held by the clutch center, and is located on the side of the second direction with respect to the center in the moving direction from the first output-side rotating plate to the second output-side rotating plate. According to the above-described example embodiment, the disc spring is located closer to the pressure plate generating the pressing force, and therefore, effectively attenuates the pressing force. This reduces or prevents a rapid increase in the assist torque and reduces or prevents rapid connection and rapid generation of a vibration of the clutch.

Another clutch device according to an example embodiment of the present invention is a clutch device to allow or block transfer of a rotation driving force of an input shaft to an output shaft. The clutch device includes a clutch center housed in a clutch housing holding a plurality of input-side rotating plates rotationally drivable by rotational driving of the input shaft, the clutch center being rotationally drivable together with the output shaft, a pressure plate movable toward and away from and rotatable with respect to the clutch center, the pressure plate holding at least a portion of a plurality of output-side rotating plates located alternately with the input-side rotating plates and being capable of pressing the input-side rotating plates and the output-side rotating plates, and a disc spring held by the pressure plate.

The clutch center includes a center-side cam portion including a center-side assist cam surface to generate a force in a direction so as to move the pressure plate toward the clutch center, in order to increase a pressing force between the input-side rotating plates and the output-side rotating plate when the clutch center rotates with respect to the pressure plate. The pressure plate includes a pressure-side cam portion including a pressure-side assist cam surface to generate a force in a direction so as to move the pressure plate toward the clutch center in order to increase the pressing force between the input-side rotating plates and the output-side rotating plate when the pressure plate rotates with respect to the clutch center. Assuming a direction in which the pressure plate moves is a moving direction, the disc spring is arranged to a side in the moving direction of the output-side rotating plates held by the pressure plate and is contactable with the output-side rotating plates held by the pressure plate.

With the clutch device according to this example embodiment of the present invention, the disc spring held by the pressure plate is arranged to the side in the moving direction of the output-side rotating plates held by the pressure plate and is contactable with the output-side rotating plate held by the pressure plate. According to the above-described example embodiment, the disc spring is located in the pressure plate generating the pressing force, and therefore, effectively attenuates the pressing force. This reduces or prevents a rapid increase in the assist torque and reduces or prevents rapid connection and rapid generation of a vibration of the clutch. According to example embodiments of the present invention, clutch devices each capable of effectively reducing or preventing a rapid increase in an assist torque by effectively attenuating a pressing force generated by an effect of an assist cam surface are provided.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, example embodiments of clutch devices according to the present invention will be described with reference to the drawings. The example embodiments described herein are, of course, not intended to particularly limit the present invention. Elements and portions having the same functions are denoted by the same reference signs, and description for the same elements and portions will be omitted or simplified as appropriate.

Figure 1:
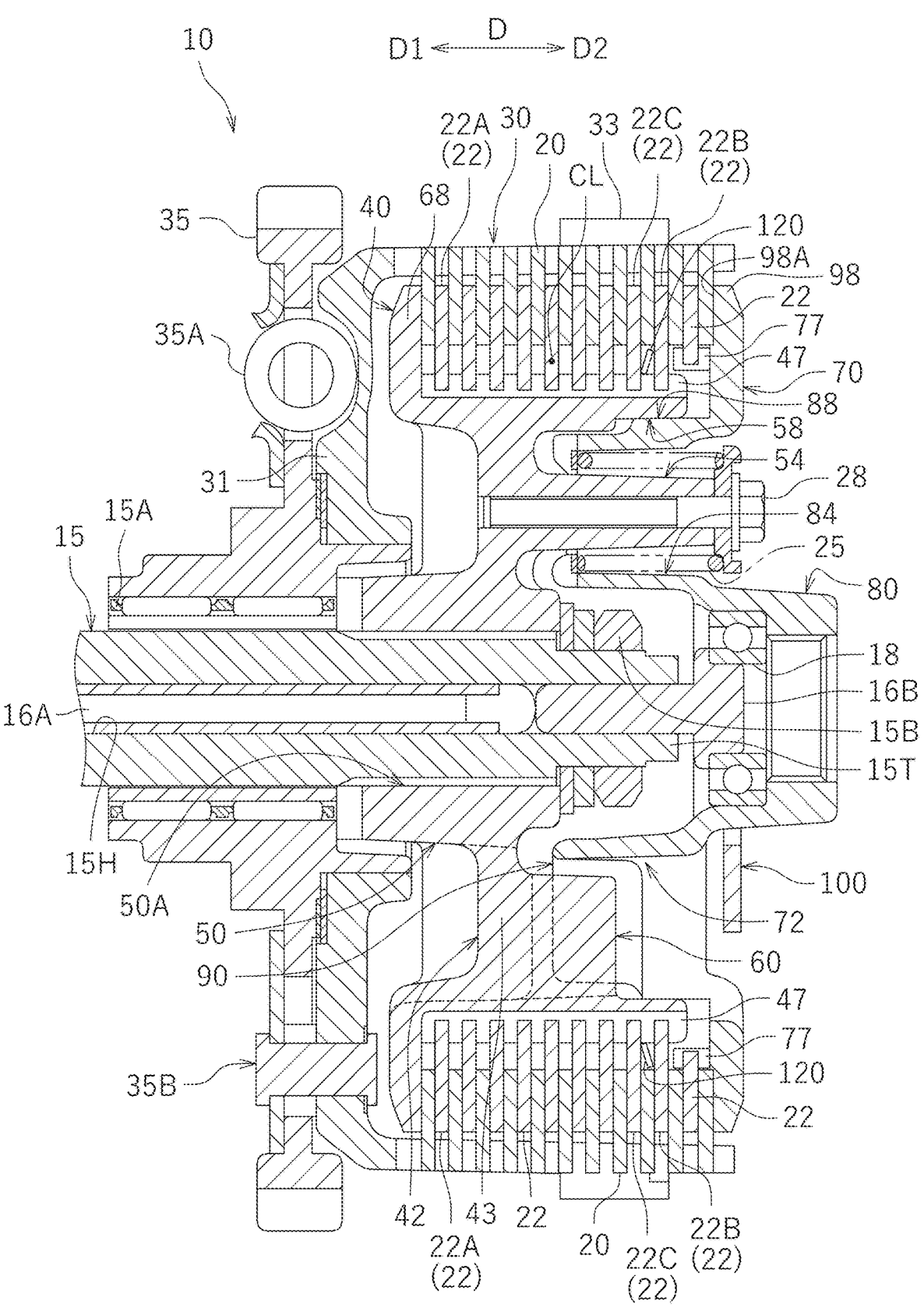
FIG. 1 is a cross-sectional view of a clutch device according to an example embodiment of the present invention.

FIG. 1 is a cross-sectional view of a clutch device 10 according to this example embodiment. The clutch device 10 is provided in, for example, a straddled vehicle such as a motorcycle or the like. The clutch device 10, for example, allows or blocks transfer of a rotation driving force of an input shaft (crankshaft) of an engine, which is a motive power source of the motorcycle, to an output shaft 15. The clutch device 10 allows or blocks transfer of the rotation driving force of the input shaft to a drive wheel (rear wheel) through the output shaft 15. The clutch device 10 is located between the engine and a transmission.

In the following description, a direction in which a pressure plate 70 of the clutch device 10 moves toward, and away from, a clutch center 40 (i.e., a direction in which the pressure plate 70 moves) will be referred to as a direction D. A direction in which the pressure plate 70 moves toward the clutch center 40 will be referred to as a first direction D1, and a direction in which the pressure plate 70 moves away from the clutch center 40 will be referred to as a second direction D2. The direction D is an example of moving direction. A circumferential direction (i.e., a rotation direction) of the clutch center 40 and the pressure plate 70 will be referred to as a circumferential direction S. Regarding the circumferential direction S, a direction from one center-side cam portion 60 toward the other center-side cam portion 60 (a direction from one pressure-side cam portion 90 toward the other pressure-side cam portion 90) will be referred to as a first circumferential direction S1 (see FIG. 2), and a direction from the other center-side cam portion 60 toward the one center-side cam portion 60 (a direction from the other pressure-side cam portion 90 toward the one pressure-side cam portion 90) will be referred to as a second circumferential direction S2 (see FIG. 2). In this example embodiment, an axial direction of the output shaft 15 is the same as the direction D. The pressure plate 70 and the clutch center 40 rotate in the first circumferential direction S1 (i.e., a direction from a center-side assist cam surface 60A toward a center-side slipper cam surface 60S of one center-side cam portion 60). It should be noted that the directions described above are defined simply for the convenience of description, and are not intended to limit the state of installation of the clutch device 10 in any way, or are not intended to limit the present invention in any way.

As shown in FIG. 1, the clutch device 10 includes the output shaft 15, a plurality of input-side rotating plates 20, a plurality of output-side rotating plates 22, a clutch housing 30, the clutch center 40, the pressure plate 70, a stopper plate 100, and a disc spring 120.

As shown in FIG. 1, the output shaft 15 is a hollow shaft. A first end of the output shaft 15 supports an input gear 35 described below and the clutch housing 30 via a needle bearing 15A such that the input gear 35 and the clutch housing 30 are rotatable. The output shaft 15 supports the clutch center 40 via a nut 15B such that the clutch center 40 is secured. That is, the output shaft 15 rotates integrally with the clutch center 40. A second end of the output shaft 15 is coupled with, for example, a transmission (not shown) of a motorcycle.

As shown in FIG. 1, the output shaft 15 includes a push rod 16A and a push member 16B provided to be adjacent to the push rod 16A in a hollow portion 15H thereof. The hollow portion 15H acts as a flow path of clutch oil. The clutch oil flows inside the output shaft 15, that is, in the hollow portion 15H. The push rod 16A and the push member 16B are slidable in the hollow portion 15H of the output shaft 15. The push rod 16A has one end thereof (left end in the figure) coupled with a clutch operation mechanism not shown (e.g., a clutch operation lever) of the motorcycle, and slides in the hollow portion 15H by an operation made on the clutch operation mechanism to press the push member 16B in the second direction D2. A portion of the push member 16B projects outward of the output shaft 15 (in this example embodiment, in the second direction D2), and is coupled with a release bearing 18 provided in the pressure plate 70. The push rod 16A and the push member 16B each have a diameter shorter than an inner diameter of the hollow portion 15H, so that the clutch oil is guaranteed to flow easily in the hollow portion 15H.

The clutch housing 30 is made of an aluminum alloy. The clutch housing 30 has a bottomed cylindrical shape. As shown in FIG. 1, the clutch housing 30 includes a bottom wall 31 having a generally circular shape and a side wall 33 extending in the second direction D2 from an edge of the bottom wall 31. The clutch housing 30 holds the plurality of input-side rotating plates 20. The clutch housing 30 holds the input-side rotating plates 20 such that the input-side rotating plates 20 are movable in the direction D with respect to the clutch housing 30 and are immovable in the circumferential direction S with respect to the clutch housing 30.

As shown in FIG. 1, the input gear 35 is provided on the bottom wall 31 of the clutch housing 30. The input gear 35 is secured to the bottom wall 31 by a rivet 35B via a torque damper 35A. The input gear 35 is meshed with a drive gear (not shown) rotatable by rotational driving of the input shaft of the engine. The input gear 35 is rotationally drivable integrally with the clutch housing 30, independently from the output shaft 15.

The input-side rotating plates 20 are rotationally drivable by the rotational driving of the input shaft. As shown in FIG. 1, the input-side rotating plates 20 are held on an inner circumferential surface of the side wall 33 of the clutch housing 30. The input-side rotating plates 20 are held by the clutch housing 30 through spline fitting. The input-side rotating plates 20 are displaceable in an axial direction of the clutch housing (i.e., in the direction D). The input-side rotating plates 20 are rotatable integrally with the clutch housing 30.

The input-side rotating plates 20 are pushed against the output-side rotating plates 22. The input-side rotating plates 20 are annular. The input-side rotating plates 20 are molded by die-cast with aluminum. The input-side rotating plates 20 include a plurality of friction members (not shown) made of paper pasted on a front surface and a rear surface thereof. Grooves each having a depth of several hundred micrometers are provided between the friction members to hold the clutch oil.

As shown in FIG. 1, the clutch center 40 is housed in the clutch housing 30. The clutch center 40 is located concentrically with the clutch housing 30. The clutch center 40 is formed of an aluminum alloy. The clutch center 40 includes a cylindrical body 42 and a flange 68 extending radially outward from an outer circumferential edge of the body 42.

The clutch center 40 holds the plurality of output-side rotating plates 22 located alternately with the input-side rotating plates 20 in the direction D. The clutch center 40 holds the output-side rotating plates 22 such that the output-side rotating plates 22 are movable in the direction D with respect to the clutch center 40 and are immovable in the circumferential direction S with respect to the clutch center 40. The clutch center 40 holds the input-side rotating plates 20 such that the input-side rotating plates 20 are movable in the direction D with respect to the clutch center 40 and are movable in the circumferential direction S with respect to the clutch center 40. The clutch center 40 is rotationally drivable together with the output shaft 15.

Figure 2:
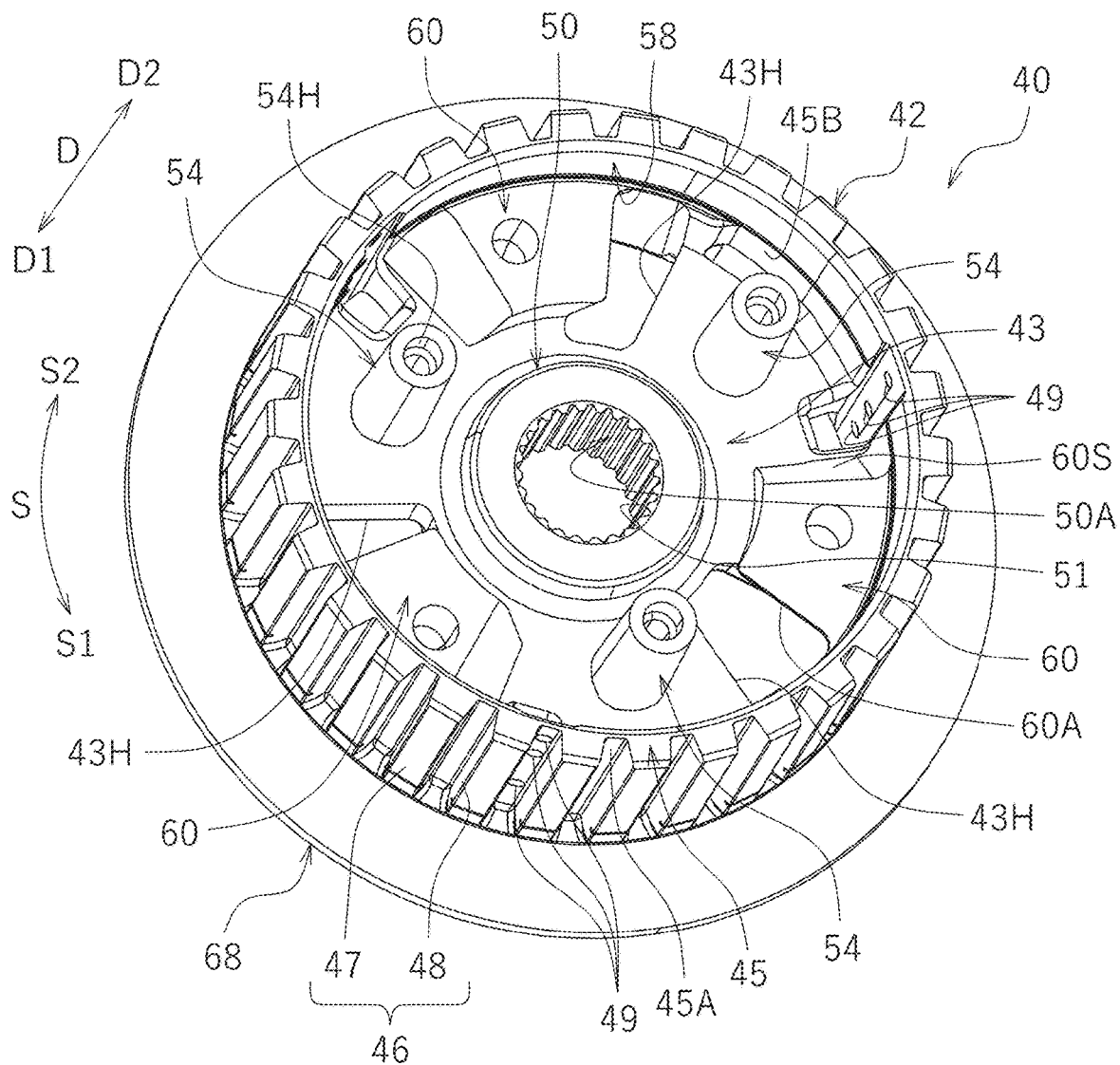
FIG. 2 is a perspective view of a clutch center according to an example embodiment of the present invention.

As shown in FIG. 2, the body 42 includes an annular base wall 43, an outer circumferential wall 45 located radially outward of the base wall 43 and extending in the second direction D2, an output shaft holding portion 50 provided at a center of the base wall 43, a plurality of the center-side cam portions 60 connected with the base wall 43 and the outer circumferential wall 45, and a center-side fitting portion 58.

The output shaft holding portion 50 is cylindrical. The output shaft holding portion 50 has an insertion hole 51 formed therein, into which the output shaft 15 is inserted and with which the output shaft 15 is spline-fitted. The insertion hole 51 penetrates the base wall 43. An inner circumferential surface 50A, of the output shaft holding portion 50, that defines the insertion hole 51 has a plurality of spline grooves formed therein, which extend in the axial direction. The output shaft 15 is coupled with the output shaft holding portion 50.

As shown in FIG. 2, the outer circumferential wall 45 of the clutch center 40 is located radially outward of the output shaft holding portion 50. A spline fitting portion 46 is provided on an outer circumferential surface 45A of the outer circumferential wall 45. The spline fitting portion 46 includes a plurality of center-side fitting teeth 47 extending in the axial direction of the clutch center 40 and arranged along the outer circumferential surface 45A of the outer circumferential wall 45, a plurality of spline grooves 48 each located between adjacent ones of the center-side fitting teeth 47 and extending in the axial direction of the clutch center 40, and oil discharge holes 49. The center-side fitting teeth 47 hold the output-side rotating plates 22. The center-side fitting teeth 47 hold the output-side rotating plates 22 such that the output-side rotating plates 22 are movable in the direction D with respect to the center-side fitting teeth 47 and are immovable in the circumferential direction S with respect to the center-side fitting teeth 47. The plurality of center-side fitting teeth 47 are arranged in the circumferential direction S. The plurality of center-side fitting teeth 47 are arranged at an equal interval in the circumferential direction S. The plurality of center-side fitting teeth 47 have the same shape as each other. The center-side fitting teeth 47 project radially outward from the outer circumferential surface 45A of the outer circumferential wall 45. The oil discharge holes 49 penetrate the outer circumferential wall 45 in the radial direction. The oil discharge holes 49 are located between adjacent ones of the center-side fitting teeth 47. That is, the oil discharge holes 49 are provided in the spline grooves 48. The oil discharge holes 49 are located to the side of the center-side cam portions 60. The oil discharge holes 49 are located to the side of the center-side slipper cam surfaces 60S of the center-side cam portions 60. The oil discharge holes 49 are located on the side of the first circumferential direction S1 with respect to the center-side slipper cam surfaces 60S. The oil discharge holes 49 are located on the side of the second circumferential direction S2 with respect to bosses 54 described below. In this example embodiment, three oil discharge holes 49 are provided at each of three positions in the circumferential direction S of the outer circumferential wall 45. The oil discharge holes 49 are located at an equal interval in the circumferential direction S. The oil discharge holes 49 communicate the inside and the outside of the clutch center 40 to each other. The oil discharge holes 49 discharge the clutch oil, flowing into the clutch center 40 from the output shaft 15, to the outside of the clutch center 40. In this example embodiment, the oil discharge holes 49 discharge the clutch oil, flowing on the side of an inner circumferential surface 45B of the outer circumferential wall 45, to the outside of the clutch center 40. The oil discharge holes 49 are, at least partially, provided at positions facing pressure-side fitting portions 88 described below.

The output-side rotating plates 22 are held by the spline fitting portion 46 of the clutch center 40 and the pressure plate 70. A portion of the output-side rotating plates 22 is held by the clutch center 40. In more detail, a portion of the output-side rotating plates 22 is held by the center-side fitting teeth 47 and the spline grooves 48 of the clutch center 40 through spline fitting. Another portion of the output-side rotating plates 22 is held by the pressure plate 70. In more detail, another portion of the output-side rotating plates 22 is held by pressure-side fitting teeth 77 described below (see FIG. 4) of the pressure plate 70. The output-side rotating plates 22 are displaceable in the axial direction of the clutch center 40 (i.e., in the direction D). The output-side rotating plates 22 are rotatable integrally with the clutch center 40.

The output-side rotating plates 22 are pushed against the input-side rotating plates 20. The output-side rotating plates 22 are flat plates that are annular. The output-side rotating plates 22 are each molded by punching a thin plate formed of an SPCC material into an annular shape. The friction members included in the input-side rotating plates 20 may be provided in the output-side rotating plates 22 instead of the input-side rotating plates 20, or may be provided in both of the input-side rotating plates 20 and the output-side rotating plates 22.

Figure 3:
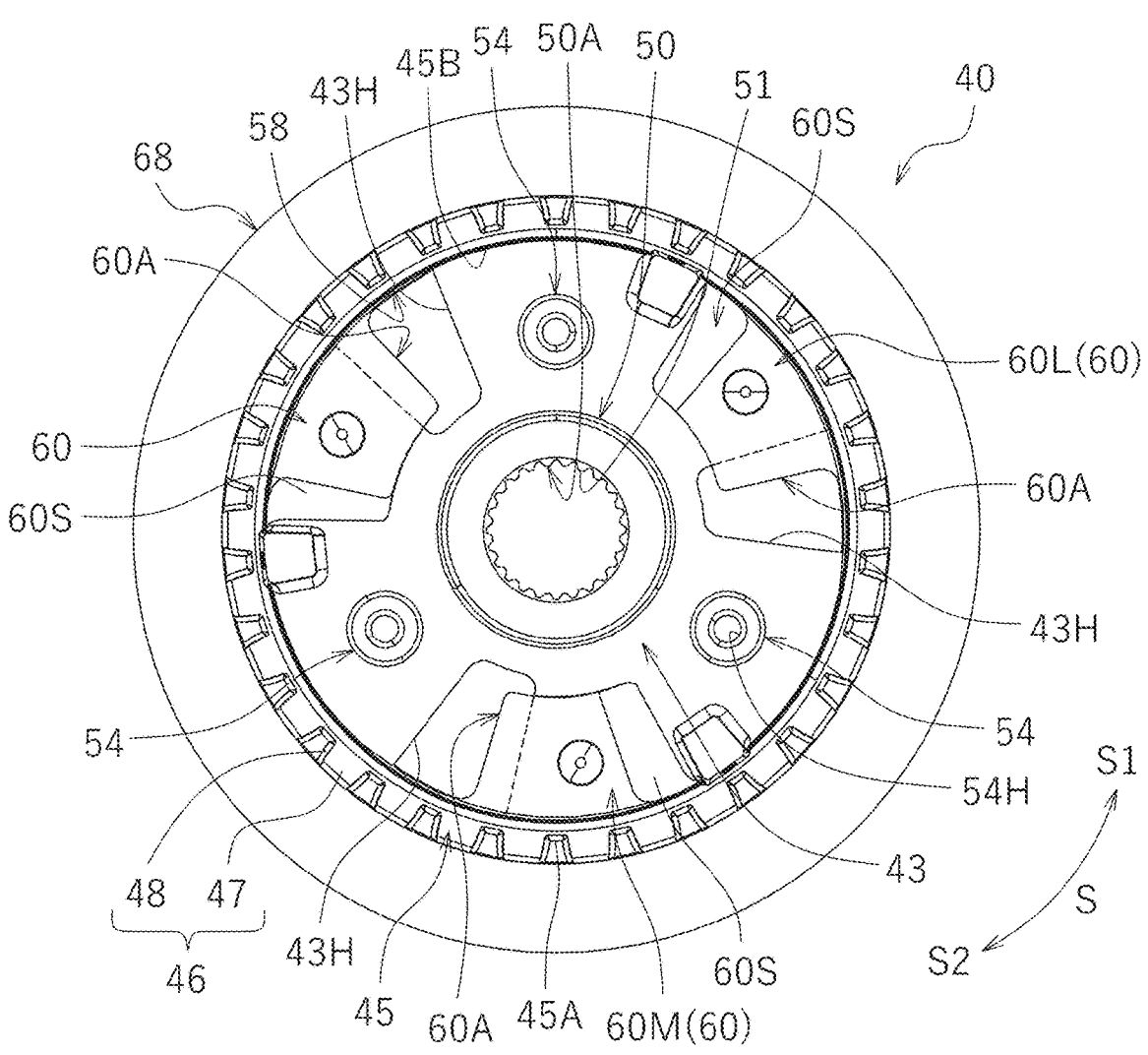
FIG. 3 is a plan view of the clutch center according to an example embodiment of the present invention.

Each of the center-side cam portions 60 has a truncated quadrangular pyramid shape with a cam surface formed of a slope acting as an Assist & Slipper (registered trademark) mechanism. The cam surface as the Assist & Slipper (registered trademark) mechanism generates an assist torque as a force increasing a pressing force (contact pressure force) between the input-side rotating plates 20 and the output-side rotating plates 22 or a slipper torque as a force separating the input-side rotating plates 20 and the output-side rotating plates 22 from each other at an early stage and shifting these plates into a half-clutch state. Each center-side cam portion 60 projects in the second direction D2 from the base wall 43. As shown in FIG. 3, the center-side cam portions 60 are located at an equal interval in the circumferential direction S of the clutch center 40. In this example embodiment, the clutch center 40 includes three center-side cam portions 60. The number of the center-side cam portions 60 is not limited to three.

As shown in FIG. 3, the center-side cam portions 60 are located radially outward of the output shaft holding portion 50. The center-side cam portions 60 each include the center-side assist cam surface 60A and the center-side slipper cam surface 60S. The center-side assist cam surface 60A is configured to generate a force in a direction so as to move the pressure plate 70 toward the clutch center 40, in order to increase the pressing force (contact pressure force) between the input-side rotating plates 20 and the output-side rotating plates 22 when the clutch center 40 rotates with respect to the pressure plate 70. In this example embodiment, when this force is generated, the position of the pressure plate 70 with respect to the clutch center 40 does not change, and the pressure plate 70 does not need to move toward the clutch center 40 physically. The pressure plate 70 may be displaced with respect to the clutch center 40 physically. The center-side slipper cam surface 60S is configured to separate the pressure plate 70 from the clutch center 40, in order to decrease the pressing force (contact pressure force) between the input-side rotating plates 20 and the output-side rotating plates 22 when the clutch center 40 rotates with respect to the pressure plate 70. Regarding two of the center-side cam portions 60 adjacent to each other in the circumferential direction S, the center-side assist cam surface 60A of one center-side cam portion 60L and the center-side slipper cam surface 60S of the other center-side cam portion 60M are opposed to each other in the circumferential direction S.

As shown in FIG. 2, the clutch center 40 includes the plurality of (in this example embodiment, three) bosses 54. The bosses 54 support the pressure plate 70 indirectly. The bosses 54 hold the pressure plate 70 via the stopper plate 100 described below (see FIG. 1) and pressure springs 25 (see FIG. 1). The plurality of bosses 54 are located at an equal interval in the circumferential direction S. The bosses 54 are each cylindrical. The bosses 54 are located radially outward of the output shaft holding portion 50. The bosses 54 extend toward the pressure plate 70 (i.e., in the second direction D2). The bosses 54 are provided on the base wall 43. The bosses 54 each have a screw hole 54H formed therein, into which a bolt 28 (see FIG. 1) is inserted. The screw holes 54H extend in the axial direction of the clutch center 40.

As shown in FIG. 2 and FIG. 3, the clutch center 40 has center-side cam holes 43H formed therein, each of which penetrates a portion of the base wall 43. The center-side cam holes 43H penetrate the base wall 43 in the direction D. The center-side cam holes 43H each extend from a position to the side of the output shaft holding portion 50 to the outer circumferential wall 45. The center-side cam holes 43H are respectively located between the center-side assist cam surfaces 60A of the center-side cam portions 60 and the bosses 54. As seen in the axial direction of the clutch center 40, each center-side assist cam surface 60A and the corresponding center-side cam hole 43H partially overlap each other.

As shown in FIG. 2, the center-side fitting portion 58 is formed radially outward of the output shaft holding portion 50. The center-side fitting portion 58 is located radially outward of the center-side cam portions 60. The center-side fitting portion 58 is located on the side of the second direction D2 with respect to the center-side cam portions 60. The center-side fitting portion 58 is located on the inner circumferential surface 45B of the outer circumferential wall 45. The center-side fitting portion 58 is configured to be slidably outserted over the pressure-side fitting portions 88 described below (see FIG. 4). An inner diameter of the center-side fitting portion 58 is set to have a fitting tolerance that permits the clutch oil, flowing out from a tip 15T (see FIG. 1) of the output shaft 15, to flow between the center-side fitting portion 58 and the pressure-side fitting portions 88. That is, there is a gap between the center-side fitting portion 58 and the pressure-side fitting portions 88 described below.

As shown in FIG. 1, the pressure plate 70 is movable toward, or away from, and to be rotatable with respect to, the clutch center 40. The pressure plate 70 is configured to be capable of pressing the input-side rotating plates 20 and the output-side rotating plates 22. The pressure plate 70 is located concentrically with the clutch center 40 and the clutch housing 30. The pressure plate 70 is made of an aluminum alloy. The pressure plate 70 includes a body 72 and a flange 98 connected with an outer circumferential edge, on the side of the second direction D2, of the body 72 and extending radially outward. The body 72 projects in the first direction D1 beyond the flange 98. The pressure plate 70 holds the plurality of output-side rotating plates 22 located alternately with the input-side rotating plates 20. The pressure plate 70 holds the output-side rotating plates 22 such that the output-side rotating plates 22 are movable in the direction D with respect to the pressure plate 70 and are immovable in the circumferential direction S with respect to the pressure plate 70. The pressure plate 70 holds the input-side rotating plates 20 such that the input-side rotating plates 20 are movable in the direction D with respect to the pressure plate 70 and are movable in the circumferential direction S with respect to the pressure plate 70.

Figure 4:
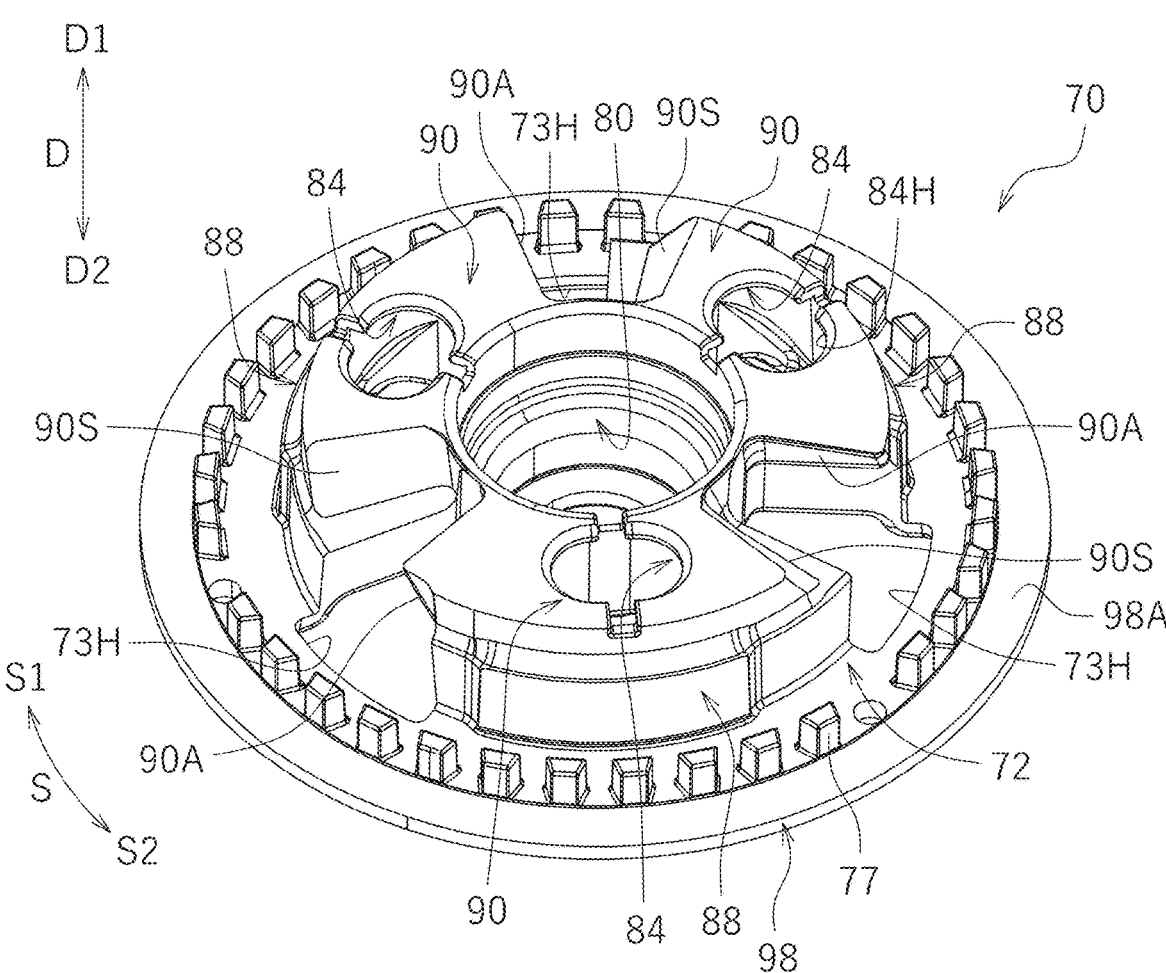
FIG. 4 is a perspective view of a pressure plate according to an example embodiment of the present invention.
Figure 6:
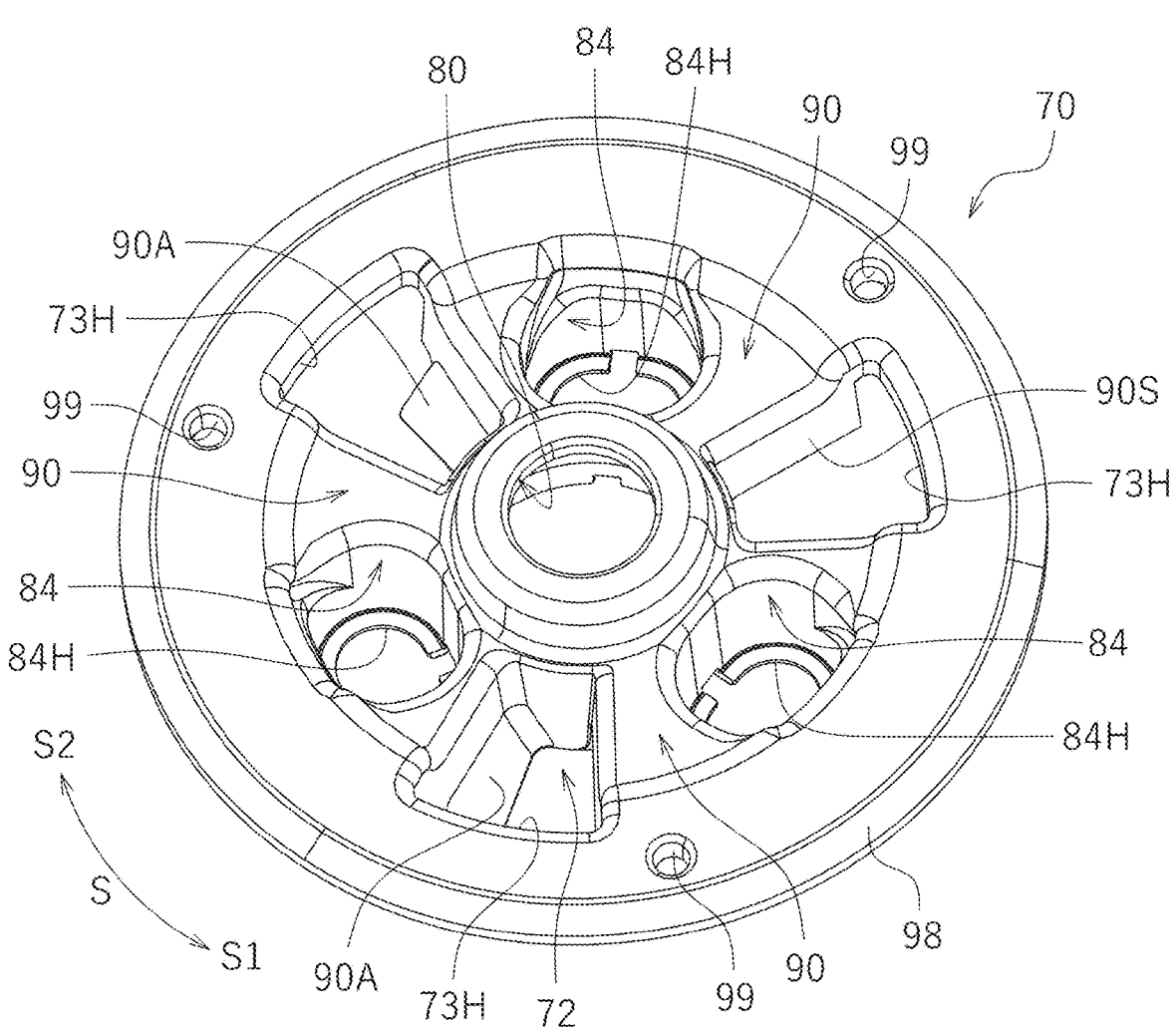
FIG. 6 is a perspective view of the pressure plate according to an example embodiment of the present invention.

As shown in FIG. 4, the body 72 includes a cylindrical portion 80, a plurality of the pressure-side cam portions 90, the pressure-side fitting portions 88, and spring housings 84 (see also FIG. 6).

As shown in FIG. 4, the flange 98 extends radially outward from the outer circumferential edge of the body 72. In this example embodiment, the flange 98 extends radially outward from an outer circumferential edge of the pressure-side fitting portions 88. The flange 98 includes a pressing surface 98A applying a pressing force onto the input-side rotating plates 20 and the output-side rotating plates 22. The pressing surface 98A contacts the input-side rotating plates 20 and the output-side rotating plates 22 directly or indirectly. The pressing surface 98A and the flange 68 of the clutch center 40 sandwich the input-side rotating plates 20 and the output-side rotating plates 22.

The cylindrical portion 80 is cylindrical. The cylindrical portion 80 is formed integrally with the pressure-side cam portions 90. The cylindrical portion 80 houses the tip 15T (see FIG. 1) of the output shaft 15. The cylindrical portion 80 houses the release bearing 18 (see FIG. 1). The cylindrical portion 80 receives a pressing force from the push member 16B. The cylindrical portion 80 receives the clutch oil flowing out from the tip 15T of the output shaft 15.

Figure 5:
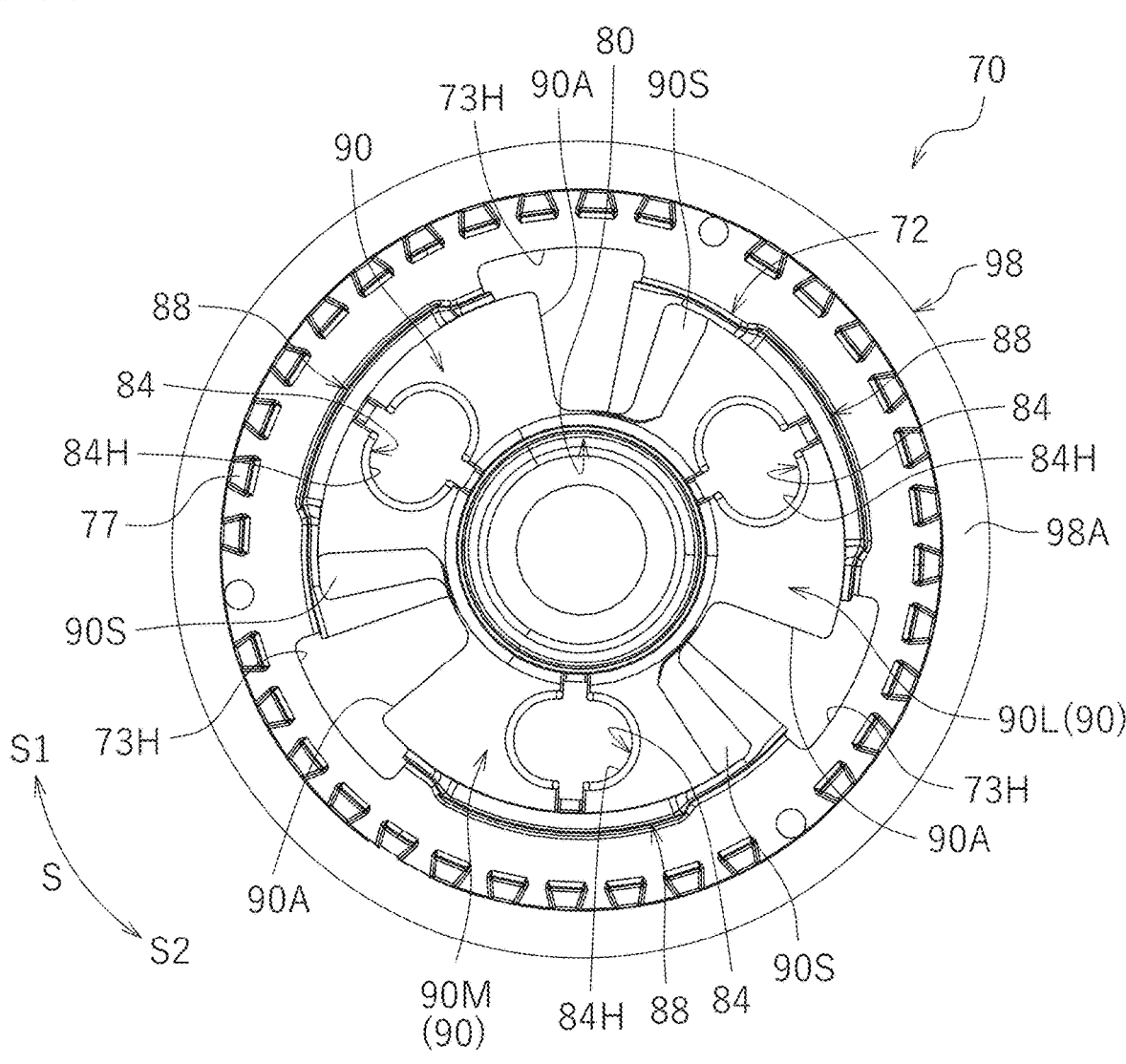
FIG. 5 is a plan view of the pressure plate according to one example embodiment of the present invention.

Each of the pressure-side cam portions 90 is formed to have a truncated quadrangular pyramid shape having a cam surface formed of a slope acting as an Assist & Slipper (registered trademark) mechanism. The cam surface as the Assist & Slipper (registered trademark) mechanism generates an assist torque or a slipper torque as a result of sliding against the corresponding center-side cam portion 60. Each pressure-side cam portion 90 is formed to project in the first direction D1 beyond the flange 98. As shown in FIG. 5, the pressure-side cam portions 90 are located at an equal interval in the circumferential direction S of the pressure plate 70. In this example embodiment, the pressure plate 70 includes three pressure-side cam portions 90. The number of the pressure-side cam portions 90 is not limited to three.

As shown in FIG. 5, the pressure-side cam portions 90 are located radially outward of the cylindrical portion 80. The pressure-side cam portions 90 each include a pressure-side assist cam surface 90A (see also FIG. 7) and a pressure-side slipper cam surface 90S. The pressure-side assist cam surface 90A is configured to be contactable with the center-side assist cam surface 60A. The pressure-side assist cam surface 90A is configured to generate a force in such as direction as to move the pressure plate 70 toward the clutch center 40, in order to increase the pressing force (contact pressure force)

between the input-side rotating plates 20 and the output-side rotating plates 22 when the pressure plate 70 rotates with respect to the clutch center 40. The pressure-side slipper cam surface 90S is configured to be contactable with the center-side slipper cam surface 60S. The pressure-side slipper cam surface 90S is configured to separate the pressure plate 70 from the clutch center 40, in order to decrease the pressing force (contact pressure force) between the input-side rotating plates 20 and the output-side rotating plates 22 when the pressure plate 70 rotates with respect to the clutch center 40. Regarding two of the pressure-side cam portions 90 adjacent to each other in the circumferential direction S, the pressure-side assist cam surface 90A of one pressure-side cam portion 90L and the pressure-side slipper cam surface 90S of the other pressure-side cam portion 90M are opposed to each other in the circumferential direction S.

Figure 8A:
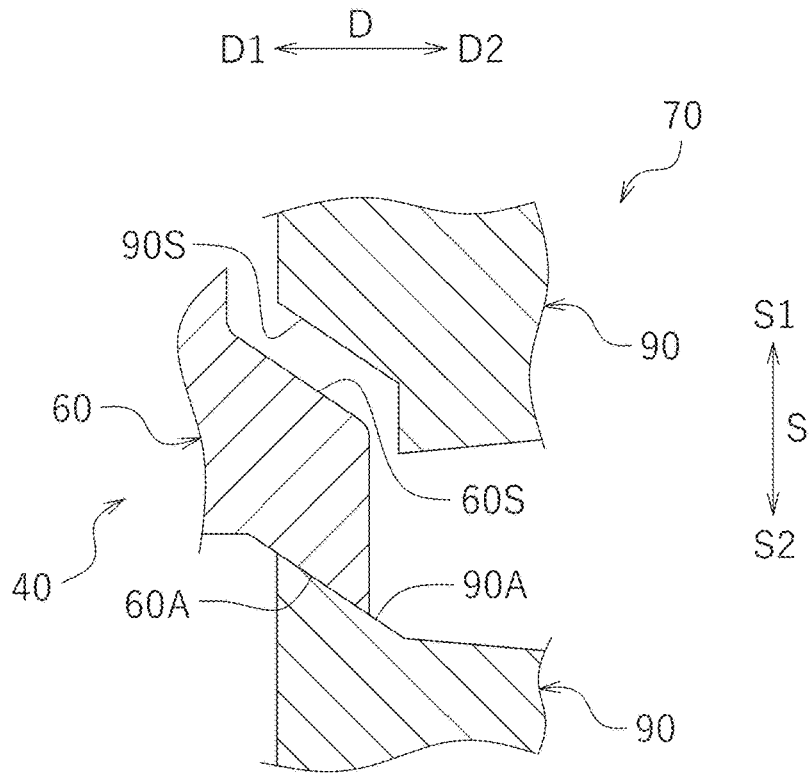
FIG. 8A is a schematic view illustrating effects of a center-side assist cam surface and a pressure-side assist cam surface.

Effects of the center-side cam portions 60 and the pressure-side cam portions 90 will now be described. Referring to FIG. 8A, when the rotation speed of the engine increases so that a rotation driving force input to the input gear 35 and the clutch housing 30 is allowed to be transferred to the output shaft 15 through the clutch center 40, a rotation force in the first circumferential direction S1 is applied to the pressure plate 70. Therefore, with the effects of the center-side assist cam surface 60A and the pressure-side assist cam surface 90A, a force in the first direction D1 is generated in the pressure plate 70. As a result, the pressing force (contact pressure force) between the input-side rotating plates 20 and the output-side rotating plates 22 increases.

Figure 8B:
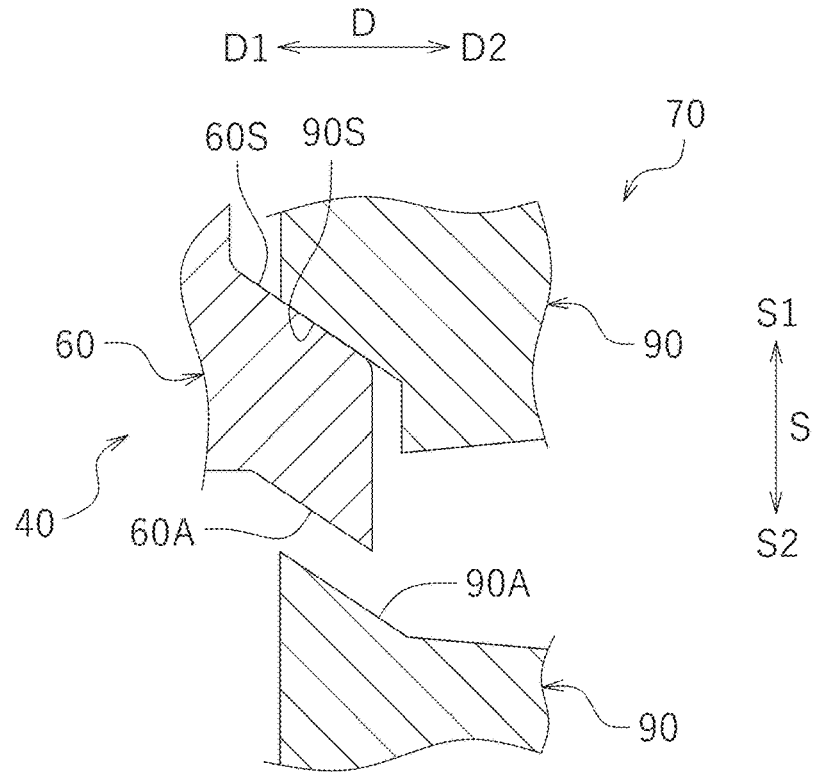
FIG. 8B is a schematic view illustrating effects of a center-side slipper cam surface and a pressure-side slipper cam surface.

By contrast, referring to FIG. 8B, when the rotation speed of the output shaft 15 exceeds the rotation speed of the input gear 35 and the clutch housing 30 and a back torque is generated, a rotation force in the first circumferential direction S1 is applied to the clutch center 40. Therefore, with the effects of the center-side slipper cam surface 60S and the pressure-side slipper cam surface 90S, the pressure plate 70 moves in the second direction D2 to release the input-side rotating plates 20 and the output-side rotating plates 22 from the pressing force (contact pressure force). In this manner, inconveniences regarding the engine and the transmission caused by the back torque are avoided.

Figure 7:
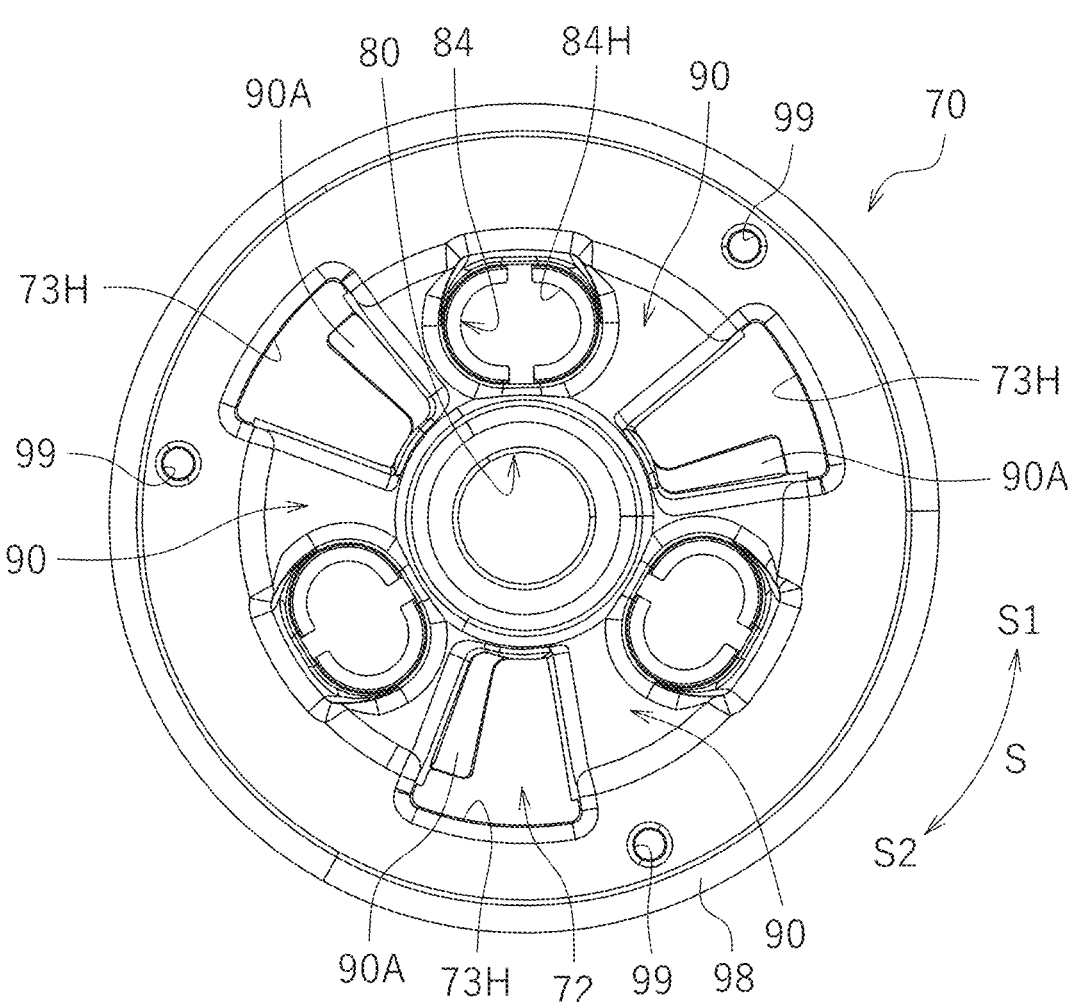
FIG. 7 is a plan view of the pressure plate according to an example embodiment of the present invention.

As shown in FIG. 4 and FIG. 5, the pressure plate 70 has pressure-side cam holes 73H formed therein, each of which penetrates a portion of the body 72 and a portion of the flange 98. The pressure-side cam holes 73H are located radially outward of the cylindrical portion 80. The pressure-side cam holes 73H each extend from a position to the side of the cylindrical portion 80 to a position radially outward of the corresponding pressure-side fitting portion 88. The pressure-side cam holes 73H are each located between adjacent ones of the pressure-side can portions 90 to penetrate the portion of the body 72 and the portion of the flange 98. The pressure-side cam holes 73H are each formed between the pressure-side assist cam surface 90A of one of two adjacent pressure-side cam portions 90 and the pressure-side slipper cam surface 90S of the other of the two adjacent pressure-side cam portions 90 to penetrate the portion of the body 72 and the portion of the flange 98. As shown in FIG. 5 and FIG. 7, as seen in the axial direction of the pressure plate 70, each pressure-side assist cam surface 90A and the corresponding pressure-side cam hole 73H partially overlap each other.

As shown in FIG. 6 and FIG. 7, the spring housings 84 are respectively provided in the pressure-side cam portions 90. The spring housings 84 are recessed in the first direction D1 from the side of the second direction D2. The spring housings 84 are elliptical. The spring housings 84 respectively house the pressure springs 25 (see FIG. 1). The spring housings 84 each have an insertion hole 84H formed therein, into which the corresponding boss 54 (see FIG. 2) is inserted. That is, the insertion holes 84H respectively penetrate the pressure-side cam portions 90. The insertion holes 84H are elliptical.

As shown in FIG. 1, the pressure springs 25 are respectively housed in the spring housings 84. The pressure springs 25 are respectively held by the bosses 54 inserted into the insertion holes 84H of the spring housings 84. The pressure springs 25 urge the pressure plate 70 toward the clutch center 40 (that is, in the first direction D1). The pressure springs 25 are, for example, coil springs made of helically wound spring steel.

As shown in FIG. 4, the pressure-side fitting portions 88 are provided on the body 72. The pressure-side fitting portions 88 are located radially outward of the pressure-side cam portions 90. The pressure-side fitting portions 88 are located on the side of the second direction D2 with respect to the pressure-side cam portions 90. The pressure-side fitting portions 88 are configured to be slidably inserted into the center-side fitting portion 58 (see FIG. 2).

As shown in FIG. 4, the pressure plate 70 includes the plurality of pressure-side fitting teeth 77 located on the flange 98. The pressure-side fitting teeth 77 hold the output-side rotating plates 22. The pressure-side fitting teeth 77 hold the output-side rotating plates 22 such that the output-side rotating plates 22 are movable in the direction D with respect to the pressure-side fitting teeth 77 and are immovable in the circumferential direction S with respect to the pressure-side fitting teeth 77. The pressure-side fitting teeth 77 hold the input-side rotating plates 20. The pressure-side fitting teeth 77 hold the input-side rotating plates 20 such that the input-side rotating plates 20 are movable in the direction D with respect to the pressure-side fitting teeth 77 and are movable in the circumferential direction S with respect to the pressure-side fitting teeth 77. The pressure-side fitting teeth 77 are located radially outward of the cylindrical portion 80. The pressure-side fitting teeth 77 are located radially outward of the pressure-side cam portions 90. The pressure-side fitting teeth 77 are located radially outward of the pressure-side fitting portions 88. The plurality of pressure-side fitting teeth 77 are arranged in the circumferential direction S. The plurality of pressure-side fitting teeth 77 are located at an equal interval in the circumferential direction S. In this example embodiment, a portion of the pressure-side fitting teeth 77 is removed, and therefore, the interval corresponding to such removed pressure-side fitting teeth 77 is wider than the other intervals. However, adjacent ones of the other pressure-side fitting teeth 77 are located at an equal interval.

As shown in FIG. 1, the stopper plate 100 is contactable with the pressure plate 70. The stopper plate 100 reduces or prevents the pressure plate 70 from being spaced away from the clutch center 40 by a predetermined distance or longer in the second direction D2. The stopper plate 100 is secured to the bosses 54 of the clutch center 40 by the bolts 28. In a state where the bosses 54 of the clutch center 40 and the pressure springs 25 are located in the spring housings 84, the pressure plate 70 is secured to the clutch center 40 by the bolts 28 being tightened to the bosses 54 via the stopper plate 100. The stopper plate 100 is generally triangular as seen in a plan view.

As shown in FIG. 1, the disc spring 120 is held by the clutch center 40. The disc spring 120 is in contact with an outer circumferential surface of the center-side fitting teeth 47 and is held by the center-side fitting teeth 47. The disc spring 120 is held to be movable in the direction D with respect to the center-side fitting teeth 47 and to be movable in the circumferential direction S with respect to the center-side fitting teeth 47. The disc spring 120 is made of, for example, carbon steel. The disc spring 120 is arranged to the side, in the direction D, of the output-side rotating plates 22 held by the clutch center 40. The disc spring 120 is contactable with the output-side rotating plates 22 held by the clutch center 40. The disc spring 120 attenuates a pressing force in a direction from the pressure plate 70 toward the clutch center 40 (that is, in the first direction D1). The disc spring 120 is located between two output-side rotating plates 22 adjacent to each other in the direction D among the output-side rotating plates 22 held by the clutch center 40. It is now assumed that among the plurality of output-side rotating plates 22 held by the clutch center 40, the output-side rotating plate 22 located farthest in the first direction D1 is a first output-side rotating plate 22A, and the output-side rotating plate 22 located farthest in the second direction D2 is a second output-side rotating plate 22B. The disc spring 120 is located on the side of the second direction D2 with respect to a center CL, in the direction D, from the first output-side rotating plate 22A to the second output-side rotating plate 22B. In this example embodiment, the disc spring 120 is located between a third output-side rotating plate 22C among the output-side rotating plates 22 held by the clutch center 40, and the second output-side rotating plate 22B. The third output-side rotating plate 22C is located on the side of the first direction D1 with respect to the second output-side rotating plate 22B, and is adjacent to the second output-side rotating plate 22B. The disc spring 120 is in contact with the second output-side rotating plate 22B and the third output-side rotating plate 22C. The input-side rotating plates 21 are located radially outward of the disc spring 120. An outer diameter of the disc spring 120 is shorter than an outer diameter of the output-side rotating plates 22. The disc spring 120 is located between the output-side rotating plates 22, and therefore, there is no need to provide an iron sheet between the disc spring 120 and the output-side rotating plates 22.

The clutch device 10 is filled with a predetermined amount of the clutch oil. The clutch oil flows in the clutch center 40 and the pressure plate 70 via the hollow portion 15H of the output shaft 15, and then is supplied to the input-side rotating plates 20 and the output-side rotating plates 22, for example, via a gap between the center-side fitting portion 58 and the pressure-side fitting portions 88 and via the oil discharge holes 49. The clutch oil prevents heat from being absorbed and prevents the friction members from being abraded. The clutch device 10 in this example embodiment is a so-called wet multi-plate friction clutch device.

As described above, in the clutch device 10 according to this example embodiment, the disc spring 120 held by the clutch center 40 is contactable with the output-side rotating plates 22 held by the clutch center 40, is provided between the output-side rotating plates 22 adjacent to each other in the direction D and held by the clutch center 40, and is located on the side of the second direction D2 with respect to the center CL, in the direction D, from the first output-side rotating plate 22A to the second output-side rotating plate 22B. According to the above-described example embodiment, the disc spring 120 is located closer to the pressure plate 70 generating the pressing force, and therefore, effectively attenuates the pressing force. This reduces or prevents a rapid increase in the assist torque and reduces or prevents rapid connection and rapid generation of a vibration of the clutch.

In the clutch device 10 according to this example embodiment, the disc spring 120 is located between the third output-side rotating plate 22C among the plurality of output-side rotating plates 22 held by the clutch center 40, and the second output-side rotating plate 22B, the third output-side rotating plate 22C being located on the side of the first direction D1 with respect to the second output-side rotating plate 22B and being adjacent to the second output-side rotating plate 22B. According to the above-described example embodiment, the disc spring 120 is located closer to the pressure plate 70 generating the pressing force, and therefore, attenuates the pressing force more effectively.

In the clutch device 10 according to this example embodiment, the disc spring 120 and the output-side rotating plates 22 are held by the center-side fitting teeth 47. According to the above-described example embodiment, the disc spring 120 and the output-side rotating plates 22 are prevented from coming off from the clutch center 40.

Figure 9:
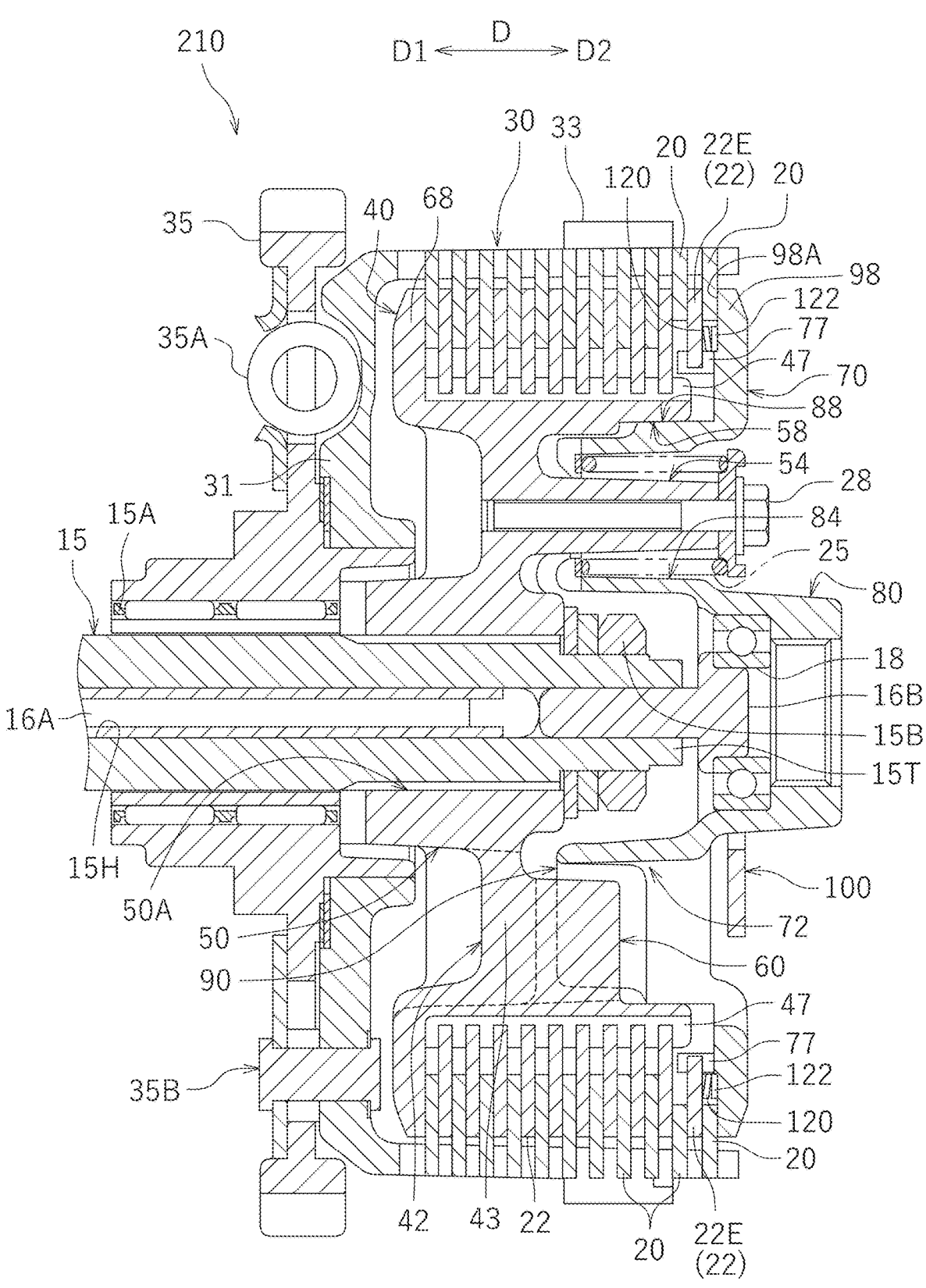
FIG. 9 is a cross-sectional view of a clutch device according to an example embodiment of the present invention.

FIG. 9 is a cross-sectional view of a clutch device 210 according to example embodiment 2. The clutch device 210 has substantially the same configuration as that of the clutch device 10 except for the position where the disc spring 120 is located.

In the clutch device 210, the disc spring 120 is held by the pressure plate 70. The disc spring 120 is in contact with an outer circumferential surface of the pressure-side fitting teeth 77 and is held by the pressure-side fitting teeth 77. The disc spring 120 is held to be movable in the direction D with respect to the pressure-side fitting teeth 77 and to be movable in the circumferential direction S with respect to the pressure-side fitting teeth 77. The disc spring 120 is arranged to the side, in the direction D, of the output-side rotating plates 22 held by the pressure plate 70. The disc spring 120 is contactable with the output-side rotating plates 22 held by the pressure plate 70. In this example embodiment, the disc spring 120 is located between an outermost output-side rotating plate 22E, which is located farthest in the second direction D2 among the output-side rotating plates 22 held by the pressure plate 70, and the flange 98. In more detail, the disc spring 120 is located between the outermost output-side rotating plate 22E and the pressing surface 98A of the flange 98. An iron sheet 122 is provided between the disc spring 120 and the flange 98. This prevents the disc spring 120 from directly contacting the flange 98, and therefore, reduces or prevents abrasion of the flange 98. The input-side rotating plate 20 are located radially outward of the disc spring 120.

As described above, in the clutch device 210 according to this example embodiment, the disc spring 120 held by the pressure plate 70 is arranged to the side, in the direction D, of the output-side rotating plates 22 held by the pressure plate 70, and is contactable with the output-side rotating plate 22 held by the pressure plate 70. According to the above-described example embodiment, the disc spring 120 is located in the pressure plate 70 generating the pressing force, and therefore, effectively attenuates the pressing force. This reduces or prevents a rapid increase in the assist torque and reduces or prevents rapid connection and rapid generation of a vibration of the clutch.

In the clutch device 210 according to example embodiment, the disc spring 120 is located between the outermost output-side rotating plate 22E, which is located farthest in the second direction D2 among the output-side rotating plates 22 held by the pressure plate 70, and the flange 98.

According to the above-described example embodiment, the disc spring 120 is located farthest in the second direction D2, and therefore, attenuates the pressing force more effectively.

In the clutch device 210 according to this example embodiment, the disc spring 120 and the output-side rotating plates 22 are held by the pressure-side fitting teeth 77. According to the above-described example embodiment, the disc spring 120 and the output-side rotating plates 22 are prevented from coming off from the pressure plate 70.

In the clutch device 210 according to this example embodiment, the clutch center 40 holds a portion of the output-side rotating plate 22, whereas the pressure plate 70 holds another portion of the output-side rotating plate 22. According to the above-described example embodiment, the force in a direction so as to move the pressure plate 70 toward the clutch center 40, which is generated when the center-side assist cam surfaces 60A and the pressure-side assist cam surfaces 90A contact each other, is adjusted. For example, the number of the output-side rotating plates 22 to be held by the pressure plate 70 may be increased, so that the above-mentioned force is increased.

Example embodiments of the present invention are described above. The above-described example embodiments are merely examples, and the present invention may be carried out in any of various other example embodiments.

In each of the above-described example embodiments, the clutch center 40 holds a portion of the output-side rotating plates 22 whereas the pressure plate 70 holds another portion of the output-side rotating plates 22. The present invention is not limited to this. For example, the clutch center 40 may be configured to hold all the output-side rotating plates 22, or the pressure plate 70 may be configured to hold all the output-side rotating plates 22.

In example embodiment 2 described above, the disc spring 120 is located between the flange 98 and the output-side rotating plates 22. The present invention is not limited to this. For example, in the case where the pressure plate 70 holds a plurality of output-side rotating plates 22, the disc spring 120 may be located between adjacent ones of the output-side rotating plates 22 held by the pressure plate 70.

An example embodiment of the present invention encompasses a case where the pressure plate holds a portion of the output-side rotating plates and a case where the pressure plate holds all the output-side rotating plates.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device to allow or block transfer of a rotation driving force of an input shaft to an output shaft, the clutch device comprising:

a clutch center housed in a clutch housing holding a plurality of input-side rotating plates rotationally drivable by rotational driving of the input shaft, the clutch center holding a plurality of output-side rotating plates located alternately with the input-side rotating plates, and being rotationally drivable together with the output shaft;

a pressure plate movable toward and away from and rotatable with respect to the clutch center, the pressure plate being capable of pressing the input-side rotating plates and the output-side rotating plates; and a spring held by the clutch center; wherein the clutch center includes a center-side cam portion including a center-side assist cam surface to generate a force in a direction so as to move the pressure plate toward the clutch center in order to increase a pressing force between the input-side rotating plates and the output-side rotating plate when the clutch center rotates with respect to the pressure plate;

the pressure plate includes a pressure-side cam portion including a pressure-side assist cam surface to generate a force in a direction so as to move the pressure plate toward the clutch center, in order to increase the pressing force between the input-side rotating plates and the output-side rotating plate when the pressure plate rotates with respect to the clutch center; and assuming a direction in which the pressure plate moves is a moving direction, a direction in which the pressure plate moves toward the clutch center is a first direction, and a direction in which the pressure plate moves away from the clutch center is a second direction;

the spring is contactable with the output-side rotating plates held by the clutch center, is located between two output-side rotating plates adjacent to each other in the moving direction among the output-side rotating plates held by the clutch center, and is located on a side of the second direction with respect to a center in the moving direction from a first output-side rotating plate located farthest in the first direction among the plurality of output-side rotating plates held by the clutch center to a second output-side rotating plate farthest in the second direction among the plurality of output-side rotating plates held by the clutch center.

2. The clutch device according to claim 1, wherein the spring is located between a third output-side rotating plate among the plurality of output-side rotating plates held by the clutch center and the second output-side rotating plate; and the third output-side rotating plate is located on a side of the first direction with respect to the second output-side rotating plate and is adjacent to the second output-side rotating plate.

3. The clutch device according to claim 1, wherein the clutch center includes:

an output shaft holding portion connected with the output shaft;

an outer circumferential wall located radially outward of the output shaft holding portion;

a plurality of center-side fitting teeth projecting radially outward from an outer circumferential surface of the outer circumferential wall, the plurality of center-side fitting teeth being arranged in a circumferential direction; and a plurality of spline grooves each located between adjacent ones of the center-side fitting teeth; and the spring and the output-side rotating plates are held by the center-side fitting teeth.

4. The clutch device according to claim 1, wherein the spring is a disc spring.

5. A clutch device to allow or block transfer of a rotation driving force of an input shaft to an output shaft, the clutch device comprising:

a clutch center housed in a clutch housing holding a plurality of input-side rotating plates rotationally drivable by rotational driving of the input shaft, the clutch center being rotationally drivable together with the output shaft;

a pressure plate movable toward and away from and rotatable with respect to the clutch center, the pressure plate holding at least a portion of a plurality of output-side rotating plates located alternately with the input-side rotating plates and being capable of pressing the input-side rotating plates and the output-side rotating plates; and a spring held by the pressure plate; wherein the clutch center includes a center-side cam portion including a center-side assist cam surface to generate a force in a direction so as to move the pressure plate toward the clutch center in order to increase a pressing force between the input-side rotating plates and the output-side rotating plate when the clutch center rotates with respect to the pressure plate;

the pressure plate includes a pressure-side cam portion including a pressure-side assist cam surface to generate a force in a direction so as to move the pressure plate toward the clutch center in order to increase the pressing force between the input-side rotating plates and the output-side rotating plate when the pressure plate rotates with respect to the clutch center; and assuming a direction in which the pressure plate moves is a moving direction, the spring is located to a side in the moving direction of the output-side rotating plates held by the pressure plate and is contactable with the output-side rotating plates held by the pressure plate.

6. The clutch device according to claim 5, wherein the pressure plate includes:

a body; and a flange extending radially outward from an outer circumferential edge of the body; wherein assuming a direction in which the pressure plates moves toward the clutch center is a first direction and a direction in which the pressure plates moves away from the clutch center is a second direction;

the spring is located between an outermost output-side rotating plate, which is located farthest on a side of the second direction among the output-side rotating plates held by the pressure plate, and the flange.

7. The clutch device according to claim 5, wherein:

the pressure plate includes a plurality of pressure-side fitting teeth arranged in a circumferential direction; and the spring and the output-side rotating plates are held by the pressure-side fitting teeth.

8. The clutch device according to claim 5, wherein the clutch center holds a first portion of the output-side rotating plates; and the pressure plate holds a second portion of the output-side rotating plates.

9. The clutch device according to claim 5, wherein the spring is a disc spring.

* * * * *